(12) United States Patent
Schulman et al.

(10) Patent No.: US 10,902,733 B2
(45) Date of Patent: Jan. 26, 2021

(54) SYSTEM AND METHOD OF PROVIDING PROMPT INFORMATION FOR FLIGHT OF UAVS, CONTROL TERMINAL AND FLIGHT SYSTEM

(71) Applicant: SZ DJI TECHNOLOGY CO., LTD., Shenzhen (CN)

(72) Inventors: Brendan Schulman, Shenzhen (CN); Shanshan Liu, Shenzhen (CN); Zhuo Xie, Shenzhen (CN); Bingzhen Yang, Shenzhen (CN); Shunnian Li, Shenzhen (CN); Yu Chen, Shenzhen (CN); Xinan Xu, Shenzhen (CN); Yayun Zheng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 253 days.

(21) Appl. No.: 16/017,769

(22) Filed: Jun. 25, 2018

(65) Prior Publication Data
US 2018/0308368 A1 Oct. 25, 2018

Related U.S. Application Data

(63) Continuation of application No. PCT/CN2015/098812, filed on Dec. 25, 2015.

(51) Int. Cl.
*G08G 5/00* (2006.01)
*G05D 1/10* (2006.01)
(Continued)

(52) U.S. Cl.
CPC .......... *G08G 5/006* (2013.01); *B64C 39/024* (2013.01); *G05D 1/0044* (2013.01); *G05D 1/106* (2019.05);
(Continued)

(58) Field of Classification Search
None
See application file for complete search history.

(56) References Cited

U.S. PATENT DOCUMENTS 10,497,270 B2 * 12/2019 Taveira ................. G05D 1/102
2010/0286859 A1 * 11/2010 Feigh ..................... G08G 5/006
701/25

(Continued)

FOREIGN PATENT DOCUMENTS

CN 103116360 A 5/2013
CN 104950907 * 6/2015 ............... G05D 1/10
(Continued)

OTHER PUBLICATIONS

The World Intellectual Property Organization (WIPO) International Search Report for PCT/CN2015/098812 dated Sep. 22, 2016 6 Pages (including translation).
(Continued)

*Primary Examiner* — Abdhesh K Jha
(74) *Attorney, Agent, or Firm* — Anova Law Group, PLLC (57) ABSTRACT

A method of providing prompt information includes obtaining sensitive area information and marking a sensitive area on a navigation map according to the sensitive area information. The sensitive area affects a flight of an unmanned aerial vehicle (UAV). The method further includes obtaining position information of the UAV, determining a positional relationship between the UAV and the sensitive area according to the sensitive area information and the position information of the UAV, and generating the prompt information according to the positional relationship.

17 Claims, 4 Drawing Sheets

(51) Int. Cl.
    *G05D 1/04*     (2006.01)
    *B64C 39/02*     (2006.01)
    *G05D 1/00*     (2006.01)

(52) U.S. Cl.
    CPC ......... *G08G 5/0013* (2013.01); *G08G 5/0034* (2013.01); *G08G 5/0069* (2013.01); *B64C 2201/146* (2013.01)

(56) References Cited

U.S. PATENT DOCUMENTS

| | | | |
|---|---|---|---|
| 2012/0143482 A1 | 6/2012 | Goossen et al. | |
| 2014/0018979 A1* | 1/2014 | Goossen | G05D 1/0044 701/3 |
| 2015/0339931 A1 | 11/2015 | Yu et al. | |
| 2016/0253907 A1* | 9/2016 | Taveira | G05D 1/106 701/3 |
| 2017/0103659 A1* | 4/2017 | Jin | G05D 1/101 |

FOREIGN PATENT DOCUMENTS

| | | |
|---|---|---|
| CN | 104932525 A | 9/2015 |
| CN | 104950907 A | 9/2015 |
| CN | 104981748 A | 10/2015 |
| CN | 105005601 A | 10/2015 |
| WO | 2015157883 A1 | 10/2015 |

OTHER PUBLICATIONS

Zhou Chen, A special no-fly map that makes drones safely take off authority needs to be perfected and released, http://www.yuchen360.cn/news/2203-0-0.html, Sep. 28, 2015, China(Machine Translation Included).

* cited by examiner

SYSTEM AND METHOD OF PROVIDING PROMPT INFORMATION FOR FLIGHT OF UAVS, CONTROL TERMINAL AND FLIGHT SYSTEM

CROSS-REFERENCE TO RELATED APPLICATION

This application is a continuation of International Application No. PCT/CN2015/098812, filed on Dec. 25, 2015, the entire contents of which are incorporated herein by reference.

TECHNICAL FIELD

The disclosure relates to a flight navigation technology for unmanned aerial vehicles (UAVs), and more particularly to a system and method of providing prompt information for flight of UAVs, a UAV control terminal and a flight system.

BACKGROUND OF THE DISCLOSURE

Unmanned aerial vehicles (UAVs) are aircrafts that fly at low altitudes. A flight of UAVs can be controlled by a remote controller. The operation condition in low altitude flight environment can be challenging and a flight can be restricted by sensitive areas. The UAV operators have to avoid a flight of UAVs in the sensitive areas, otherwise they may be subject to liability as affecting public security. Therefore, UAV operators need the sensitive area information near the UAV in decision making.

SUMMARY OF THE DISCLOSURE

In view of above, there is a need to provide a system and method of providing prompt information for a flight of unmanned aerial vehicles (UAVs), a UAV control terminal, a processor, a memory and a flight system to address the problems in the conventional technologies.

An aspect of the present disclosure provides a method of providing prompt information for a flight of unmanned aerial vehicle (UAV). The method can comprise obtaining sensitive area information and marking a sensitive area on a navigation map according to the sensitive area information, the sensitive area affecting a flight of the UAV; obtaining position information of the UAV and determining a positional relationship between the UAV and the sensitive area according to the sensitive area information and position information of the UAV; and generating prompt information according to the positional relationship.

In some embodiments, the obtained sensitive area information can comprise at least one of pre-stored sensitive area information or sensitive area information received in real time.

In some embodiments, the sensitive area information can comprise a type of sensitive area. The method can further comprise: setting a correspondence between the type of sensitive area and a level of sensitivity; and setting a correspondence between the level of sensitivity and a pattern of marking.

In some embodiments, the type of sensitive area can at least comprise a warning zone, a releasable flight-restricted zone and a non-releasable no-fly zone. The level of sensitivity can at least comprise level one, level two and level three. The process of setting a correspondence between the type of sensitive area and the level of sensitivity can comprise: associating the warning zone with the level one, a sensitive area of level one being configured to provide a warning prompt to a flight of the UAV; associating the flight-restricted zone with the level two, a sensitive area of level two being configured to provide a restriction prompt to a flight of the UAV; and associating the no-fly zone with the level three, a sensitive area of level three being configured to provide a prohibition prompt to a flight of the UAV.

In some embodiments, the sensitive area information can further comprise position information of sensitive area. The process of marking a sensitive area on a navigation map according to the sensitive area information can comprise determining a position of the sensitive area on the navigation map according to the position information of sensitive area; determining the level of sensitivity of the sensitive area according to the type of sensitive area; and marking the sensitive area using a pattern of marking associating to the determined level of sensitivity.

In some embodiments, the method can further comprise marking the level of sensitivity of the sensitive area on the navigation map.

In some embodiments, the pattern of marking can comprise at least one of a color block or an icon. A color of the color block can at least comprise green, yellow or red. A shape of the color block can comprise at least one of a regular contour or an actual contour of a sensitive area. The icon can at least comprise an icon of a representative object in a sensitive area.

In some embodiments, the regular contour can comprise at least one of a circular contour, a square contour or an equilateral polygonal contour.

In some embodiments, the method can further comprise marking the sensitive area using a color block having a regular contour. The color block having a regular contour can completely cover an actual contour of the sensitive area.

In some embodiments, the method can further comprise marking the actual contour of the sensitive area using a dashed line.

In some embodiments, the process of setting a correspondence between a level of sensitivity and a pattern of marking further can comprise associating the level one with a green color block; associating the level two with a yellow color block; and associating the level three with a red color block.

In some embodiments, the method can further comprise receiving a setting operation information with respect to adding or removing a marking of the warning zone, and adding or removing the marking of the warning zone according to the received setting operation information.

In some embodiments, the process of determining a positional relationship between the UAV and the sensitive area according to the sensitive area information and position information of the UAV can comprise determining the positional relationship between the UAV and the marked sensitive area according to the sensitive area information marked on the navigation map and the position information of the UAV.

In some embodiments, the prompt information can be generated if the positional relationship shows that a horizontal distance between the UAV and the sensitive area is less than a predefined distance. The prompt information can comprise at least one of the type of the sensitive area, the level of sensitivity of the sensitive area or a distance between the UAV and the sensitive area.

In some embodiments, the method can further comprise providing the prompt information by an audio signal; and/or displaying a navigation prompt interface containing the prompt information.

In some embodiments, the prompt information can be generated if the positional relationship shows that a position of the UAV is within the marked sensitive area. The prompt information can comprise at least one of the type of sensitive area or the level of sensitivity of the sensitive area.

In some embodiments, the method can further comprise displaying a navigation prompt interface containing the prompt information.

In some embodiments, the method can further comprise providing the prompt information by an audio signal.

In some embodiments, when the positional relationship shows that a position of the UAV is within the marked warning zone, the prompt information can further comprise prompt information alerting a flight of the UAV, and the navigation prompt interface further comprises at least a prompt option as to whether to remove a marking of the warning zone.

In some embodiments, the method can further comprise receiving operation information with respect to the prompt option, and removing a mark of the warning zone if the operation information indicates a removal of a marking of the warning zone.

In some embodiments, when the positional relationship shows that a position of the UAV is within the marked flight-restricted zone, the prompt information can further comprise prompt information restricting a flight of the UAV, and the navigation prompt interface can at least comprise a prompt option as to whether to release the flight-restricted zone.

In some embodiments, the method can further comprise receiving operation information with respect to the prompt option; obtaining a valid identity information and sending the operation information and the valid identity information to a supervisory platform if the operation information indicates a release of the flight-restricted zone; and removing a marking of the flight-restricted zone if a releasing instruction is received from the supervisory platform.

In some embodiments, the valid identity information can comprise at least one of an identity information of a UAV operator or an authentication certificate. The authentication certificate can at least comprise an authenticated identity information of the UAV operator.

In some embodiments, the method can further comprise removing the navigation prompt interface corresponding to the sensitive area if a marking of the sensitive area is removed.

In some embodiments, the method can further comprise, if a plurality of sensitive areas having different levels of sensitivity overlap and a marking of a sensitive area having a lower level of sensitivity is removed, maintaining a marking of a sensitive area having a higher level of sensitivity in the overlapped area.

In some embodiments, when the positional relationship shows that a position of the UAV is within the marked no-fly zone, the prompt information can further comprise prompt information prohibiting a flight of the UAV, and the navigation prompt interface can further comprise at least one of a plurality of confirmation options including confirming a permission of entering the no-fly zone, confirming a liability of flying in the no-fly one and confirming continuing a flight in the no-fly zone.

In some embodiments, the method can further comprise receiving operation information with respect to the confirmation option and sending the operation information to a supervisory platform.

In some embodiments, the method can further comprise marking position information of the UAV on the navigation map according to the position information of the UAV.

In some embodiments, the method can further comprise displaying the navigation map before marking the sensitive area on the navigation map.

In some embodiments, the process of generating prompt information according to the positional relationship can comprise generating prompt information instructing the UAV to land or leave the sensitive area if the UAV is in the sensitive area.

In some embodiments, operation information can be received and a control instruction is generated during a landing of the UAV, such that a flight controller of the UAV directs to change a flight path of the UAV according to the control instruction.

In some embodiments, the process of instructing the UAV to leave the sensitive area can comprise receiving operation information and generating a control instruction, such that the UAV is directed to leave the sensitive area according to the control instruction; or calculating a shortest flight path and directing the UAV to leave the sensitive area along the shortest path.

Another aspect of the disclosure provides a prompt system for a flight of unmanned aerial vehicle (UAV). The prompt system can comprise a obtaining module configured to obtain sensitive area information and position information of a UAV; a control module configured to mark a sensitive area on a navigation map according to the sensitive area information, the sensitive area affecting a flight of the UAV; and a processing module configured to determine a positional relationship between the UAV and the sensitive area according to the sensitive area information and position information of the UAV, and generate prompt information according to the positional relationship.

In some embodiments, the obtained sensitive area information can comprise at least one of pre-stored sensitive area information or sensitive area information received in real time.

In some embodiments, the sensitive area information can comprise a type of sensitive area. The prompt system can further comprise a setting module configured to set a correspondence between the type of sensitive area and a level of sensitivity and a correspondence between the level of sensitivity and a pattern of marking.

In some embodiments, the type of sensitive area can at least comprise a warning zone, a releasable flight-restricted zone and a non-releasable no-fly zone. The level of sensitivity can at least comprise level one, level two, level three. In setting a correspondence between the type of sensitive area and the level of sensitivity, the setting module can be configured to associate the warning zone with the level one, a sensitive area of level one being configured to provide a warning prompt to a flight of the UAV; associate the flight-restricted zone with the level two, a sensitive area of level two being configured to provide a restriction prompt to a flight of the UAV; and associate the no-fly zone with the level three, a sensitive area of level three being configured to provide a prohibition prompt to a flight of the UAV.

In some embodiments, the sensitive area information can further comprise position information of sensitive area. In marking a sensitive area on a navigation map according to the sensitive area information, the control module can be configured to determine a position of the sensitive area on the navigation map according to the position information of sensitive area; determine the level of sensitivity of the sensitive area according to the type of sensitive area; and mark the sensitive area using a pattern of marking corresponding to the determined level of sensitivity.

In some embodiments, the control module can be further configured to mark the level of sensitivity of the sensitive area on the navigation map.

In some embodiments, the pattern of marking can comprise at least one of a color block or an icon. A color of the color block CAN at least comprises green, yellow or red. A shape of the color block can comprise at least one of a regular contour or an actual contour of a sensitive area. The icon can at least comprise an icon of a representative object in a sensitive area.

In some embodiments, the regular contour can comprise at least one of a circular contour, a square contour or an equilateral polygonal contour.

In some embodiments, the control module can be configured to mark the sensitive area using a color block having a regular contour. The color block having a regular contour can completely cover an actual contour of the sensitive area.

In some embodiments, the control module can be configured to mark the actual contour of the sensitive area using a dashed line.

In some embodiments, in setting a correspondence between a level of sensitivity and a pattern of marking, the setting module can be configured to associate the level one with a green color block; associate the level two with a yellow color block; and associate the level three with a red color block.

In some embodiments, the processing module can be further configured to receive a setting operation information with respect to adding or removing a marking of the warning zone, and adding or removing the marking of the warning zone according to the received setting operation information.

In some embodiments, in determining a positional relationship between the UAV and the sensitive area, the processing module can be configured to determine the positional relationship between the UAV and the marked sensitive area according to the sensitive area information marked on the navigation map and the position information of the UAV.

In some embodiments, the processing module can be further configured to generate the prompt information if the positional relationship shows that a horizontal distance between the UAV and the sensitive area is less than a predefined distance. The prompt information can comprise at least one of the type of the sensitive area, the level of sensitivity of the sensitive area or a distance between the UAV and the sensitive area.

In some embodiments, the prompt system can further comprise a prompt module configured to provide the prompt information by an audio signal; and/or display a navigation prompt interface containing the prompt information.

In some embodiments, the processing module can be further configured to generate the prompt information if the positional relationship shows that a position of the UAV is within the marked sensitive area. The prompt information can comprise at least one of the type of sensitive area or the level of sensitivity of the sensitive area.

In some embodiments, the prompt system can further comprise a prompt module configured to display a navigation prompt interface containing the prompt information.

In some embodiments, the prompt module can be further configured to provide the prompt information by an audio signal.

In some embodiments, when the positional relationship shows that a position of the UAV is within the marked warning zone, the prompt information can further comprise prompt information alerting a flight of the UAV, and the navigation prompt interface can further comprise at least a prompt option as to whether to remove a marking of the warning zone.

In some embodiments, the processing module can be further configured to operation information with respect to the prompt option, and remove a mark of the warning zone if the operation information indicates a removal of a marking of the warning zone.

In some embodiments, when the positional relationship shows that a position of the UAV is within the marked flight-restricted zone, the prompt information can further comprise prompt information restricting a flight of the UAV, and the navigation prompt interface can at least comprise a prompt option as to whether to release the flight-restricted zone.

In some embodiments, the processing module can be further configured to receive operation information with respect to the prompt option; obtain a valid identity information and send the operation information and the valid identity information to a supervisory platform if the operation information indicates a release of the flight-restricted zone; and remove a marking of the flight-restricted zone if a releasing instruction is received from the supervisory platform.

In some embodiments, the valid identity information can comprise at least one of an identity information of a UAV operator or an authentication certificate. The authentication certificate can at least comprise an authenticated identity information of the UAV operator.

In some embodiments, the processing module can be further configured to remove the navigation prompt interface corresponding to the sensitive area if a marking of the sensitive area is removed.

In some embodiments, the processing module can be further configured to, if a plurality of sensitive areas having different levels of sensitivity overlap and a marking of a sensitive area having a lower level of sensitivity is removed, maintain a marking of a sensitive area having a higher level of sensitivity in the overlapped area.

In some embodiments, when the positional relationship shows that a position of the UAV is within the marked no-fly zone, the prompt information can further comprise prompt information prohibiting a flight of the UAV, and the navigation prompt interface can further comprise at least one of a plurality of confirmation options including confirming a permission of entering the no-fly zone, confirming a liability of flying in the no-fly one and confirming continuing a flight in the no-fly zone.

In some embodiments, the receiving module can be further configured to receive operation information with respect to the confirmation option and send the operation information to a supervisory platform.

In some embodiments, the control module can be further configured to mark position information of the UAV on the navigation map according to the position information of the UAV.

In some embodiments, the control module can be further configured to control a display screen to display the navigation map before marking the sensitive area on the navigation map.

In some embodiments, in generating prompt information according to the positional relationship, the processing module can be configured to generate prompt information instructing the UAV to land or leave the sensitive area if the UAV is in the sensitive area.

In some embodiments, the processing module can be further configured to receive operation information and generate a control instruction during a landing of the UAV, such that a flight controller of the UAV directs to change a flight path of the UAV according to the control instruction.

In some embodiments, in instructing the UAV to leave the sensitive area, the processing module can be further configured to receive operation information and generate a control instruction, such that the UAV is directed to leave the sensitive area according to the control instruction; or calculate a shortest flight path and directing the UAV to leave the sensitive area along the shortest path.

Another aspect of the present disclosure provides a control terminal. The control terminal can comprise a communication device and a processor, the communication device being configured to communicate with an unmanned aerial vehicle (UAV) and receive position information of the UAV. In some embodiments, the processor can be configured to obtain sensitive area information and marking a sensitive area on a navigation map according to the sensitive area information, the sensitive area affecting a flight of the UAV; obtain position information of the UAV and determining a positional relationship between the UAV and the sensitive area according to the sensitive area information and position information of the UAV; and generate prompt information according to the positional relationship.

In some embodiments, a type of sensitive area can at least comprise a warning zone, a releasable flight-restricted zone and a non-releasable no-fly zone. A level of sensitivity can at least comprise level one, level two and level three. The processor can be further configured to associate the warning zone with the level one, a sensitive area of level one being configured to provide a warning prompt to a flight of the UAV; associate the flight-restricted zone with the level two, a sensitive area of level two being configured to provide a restriction prompt to a flight of the UAV; and associate the no-fly zone with the level three, a sensitive area of level three being configured to provide a prohibition prompt to a flight of the UAV.

In some embodiments, the sensitive area information can further comprise position information of sensitive area. The processor can be configured to determine a position of the sensitive area on the navigation map according to the position information of sensitive area; determine the level of sensitivity of the sensitive area according to the type of sensitive area; and mark the sensitive area using a pattern of marking corresponding to the determined level of sensitivity.

In some embodiments, the processor can be configured to mark the sensitive area using a color block having a regular contour. The color block having a regular contour can completely covers an actual contour of the sensitive area.

In some embodiments, the processor can be configured to determine the positional relationship between the UAV and the marked sensitive area according to the sensitive area information marked on the navigation map and the position information of the UAV.

In some embodiments, the processor can be further configured to mark position information of the UAV on the navigation map according to the position information of the UAV.

Another aspect of the present disclosure provides a processor used in a control terminal of an unmanned aerial vehicle (UAV). In some embodiments, the processor can be configured to obtain sensitive area information and marking a sensitive area on a navigation map according to the sensitive area information, the sensitive area affecting a flight of the UAV; obtain position information of the UAV and determining a positional relationship between the UAV and the sensitive area according to the sensitive area information and position information of the UAV; and generate prompt information according to the positional relationship.

In some embodiments, a type of sensitive area can at least comprise a warning zone, a releasable flight-restricted zone and a non-releasable no-fly zone. A level of sensitivity can at least comprises level one, level two and level three. The processor can be further configured to associate the warning zone with the level one, a sensitive area of level one being configured to provide a warning prompt to a flight of the UAV; associate the flight-restricted zone with the level two, a sensitive area of level two being configured to provide a restriction prompt to a flight of the UAV; and associate the no-fly zone with the level three, a sensitive area of level three being configured to provide a prohibition prompt to a flight of the UAV.

In some embodiments, the sensitive area information can further comprise position information of sensitive area. The processor can be configured to determine a position of the sensitive area on the navigation map according to the position information of sensitive area; determine the level of sensitivity of the sensitive area according to the type of sensitive area; and mark the sensitive area using a pattern of marking corresponding to the determined level of sensitivity.

In some embodiments, the processor can be configured to mark the sensitive area using a color block having a regular contour. The color block having a regular contour can completely covers an actual contour of the sensitive area.

In some embodiments, the processor can be configured to determine the positional relationship between the UAV and the marked sensitive area according to the sensitive area information marked on the navigation map and the position information of the UAV.

In some embodiments, the processor can be further configured to mark a flight position of the UAV on the navigation map according to the position information of the UAV.

Another aspect of the present disclosure provides a memory used in a control terminal of a UAV. In some embodiments, the memory can be configured to store program instructions which are obtained by a processor to obtain sensitive area information and marking a sensitive area on a navigation map according to the sensitive area information, the sensitive area affecting a flight of the UAV; obtain position information of the UAV and determining a positional relationship between the UAV and the sensitive area according to the sensitive area information and position information of the UAV; and generate prompt information according to the positional relationship.

In some embodiments, a type of sensitive area can at least comprise a warning zone, a releasable flight-restricted zone and a non-releasable no-fly zone. In some embodiments, a level of sensitivity can at least comprise level one, level two and level three. The program instructions can be further obtained by the processor to associate the warning zone with the level one, a sensitive area of level one being configured to provide a warning prompt to a flight of the UAV; associate the flight-restricted zone with the level two, a sensitive area of level two being configured to provide a restriction prompt to a flight of the UAV; and associate the no-fly zone with the level three, a sensitive area of level three being configured to provide a prohibition prompt to a flight of the UAV.

In some embodiments, the sensitive area information can further comprise position information of sensitive area. The program instructions can be further obtained by the processor to determine a position of the sensitive area on the navigation map according to the position information of sensitive area; determine the level of sensitivity of the sensitive area according to the type of sensitive area; and mark the sensitive area using a pattern of marking corresponding to the determined level of sensitivity.

Another aspect of the present disclosure provides a flight system. In some embodiments, the flight system can comprise an unmanned aerial vehicle (UAV); a control terminal configured to communicate with the UAV and control a flight of the UAV; and a processor configured to obtain sensitive area information and marking a sensitive area on a navigation map according to the sensitive area information, the sensitive area affecting a flight of the UAV; obtain position information of the UAV and determining a positional relationship between the UAV and the sensitive area according to the sensitive area information and position information of the UAV; and generate prompt information according to the positional relationship.

In some embodiments, a type of sensitive area can at least comprise a warning zone, a releasable flight-restricted zone and a non-releasable no-fly zone. In some embodiments, a level of sensitivity can at least comprise level one, level two and level three. The processor can be further configured to associate the warning zone with the level one, a sensitive area of level one being configured to provide a warning prompt to a flight of the UAV; associate the flight-restricted zone with the level two, a sensitive area of level two being configured to provide a restriction prompt to a flight of the UAV; and associate the no-fly zone with the level three, a sensitive area of level three being configured to provide a prohibition prompt to a flight of the UAV.

In some embodiments, the sensitive area information can further comprise position information of sensitive area. The processor can be configured to determine a position of the sensitive area on the navigation map according to the position information of sensitive area; determine the level of sensitivity of the sensitive area according to the type of sensitive area; and mark the sensitive area using a pattern of marking corresponding to the determined level of sensitivity.

In some embodiments, the processor can be configured to mark the sensitive area using a color block having a regular contour. The color block having a regular contour can completely cover an actual contour of the sensitive area.

In some embodiments, the processor can be configured to determine the positional relationship between the UAV and the marked sensitive area according to the sensitive area information marked on the navigation map and the position information of the UAV.

In some embodiments, the processor can be further configured to mark a flight position of the UAV on the navigation map according to the position information of the UAV.

In some embodiments, the processor can be provided on the control terminal.

With the method of providing prompt information for flight of UAVs in accordance with embodiments of the disclosure, the UAV operator can be provided with a positional information of sensitive areas and a prompt which is generated from a positional relationship of UAV relative to marked sensitive areas in an intuitive manner. The UAV operator can thus make a correct flight decision.

LIST OF REFERENCE NUMERALS

Flight system 100
Control terminal 20
Communication device 21
Memory device 22
Processor 23
Display screen 24
Prompt system 25
Obtaining module 251
Control module 252
Processing module 253
Setting module 254
Prompt module 255
Mobile device 30
Remote controller 40
UAV 50
Method of providing prompt information 200
Steps 201-205

The present disclosure will be described in the illustrative embodiments by reference to the drawings.

DETAILED DESCRIPTION OF THE DISCLOSURE

A better understanding of the disclosure will be obtained by reference to the following detailed description that sets forth illustrative embodiments with reference to the drawings. It will be apparent that, the embodiments described herein are merely provided by way of example only. Those skilled in the art can conceive other embodiments in light of those embodiments disclosed herein without inventive efforts, and all these embodiments are within the scope of the disclosure.

Figure 1:
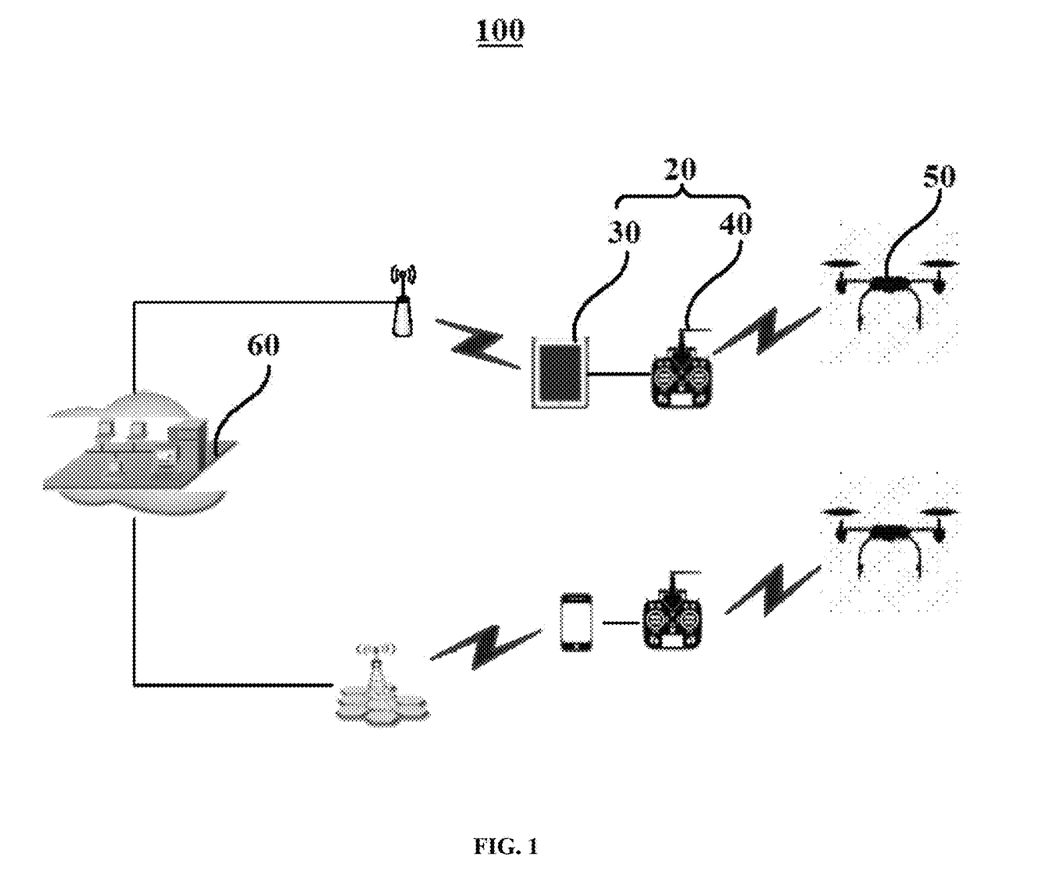
FIG. 1 shows a configuration of a flight system in accordance with embodiments of the disclosure.

FIG. 1 shows a configuration of a flight system 100 in accordance with embodiments of the disclosure. The flight system 100 can comprise at least a control terminal 20 and an unmanned aerial vehicle (UAV) 50. The control terminal 20 can be configured to communicate with the UAV 50 and control a flight of the UAV 50.

In some embodiments, the control terminal 20 can be configured to mark a sensitive area on a navigation map and generate a corresponding prompt information according to a positional relationship of the UAV 50 relative to the marked sensitive area, such that a UAV operator can make a correct flight decision to control the UAV 50 to fly outside the sensitive area.

In some embodiments, the control terminal 20 can comprise a mobile device 30 and a remote controller 40 of the UAV 50 which is connected to the mobile device 30. The mobile device 30 can communicate with the UAV 50 via the remote controller 40 and can be configured to mark a sensitive area on the navigation map. The mobile device 30 can include, but not limited to, a smartphone or a tablet computer.

A communication connection can be established between the mobile device 30 and the remote controller 40 using a USB serial connection. A communication and a data transmission can be effected between the mobile device 30 and the remote controller 40 through an MFI protocol (IOS) or an OTG protocol (Android). Optionally, a communication connection can be established between the remote controller 40 and the mobile device 30 using a wireless transmission technology, such as 2.4 GHz or 5 GHz wireless technology.

A communication connection can be established between the remote controller 40 and the UAV 50 using a wireless transmission technology, such as 2.4 GHz or 5 GHz wireless technology.

Alternatively, the control terminal 20 can be a multi-function remote controller 40 which incorporates functions of the mobile device 30 and the remote controller 40 of the UAV 50.

In some embodiments, the flight system 100 can further comprise a supervisory platform 60. The supervisory platform 60 can be configured to communicate with the control terminal 20, obtain a flight state information of the UAV 50 to monitor a flight behavior of the UAV 50, and send sensitive area information in real time to the control terminal 20, such that the UAV operator is informed to control the UAV 50 to avoid a sensitive area.

In some instances, a communication connection can be established between the supervisory platform 60 and the control terminal 20 using a mobile communication network (e.g., 2G, 3G, 4G or 5G network) and/or wireless access (e.g., WI-FI).

In some instances, the supervisory platform 60 can communicate with the UAV 50 directly or indirectly, and send a flight restriction instruction to the UAV 50 while the UAV 50 is flying in a sensitive area in breach of security regulations so as to directly control a flight of the UAV 50.

Figure 2:
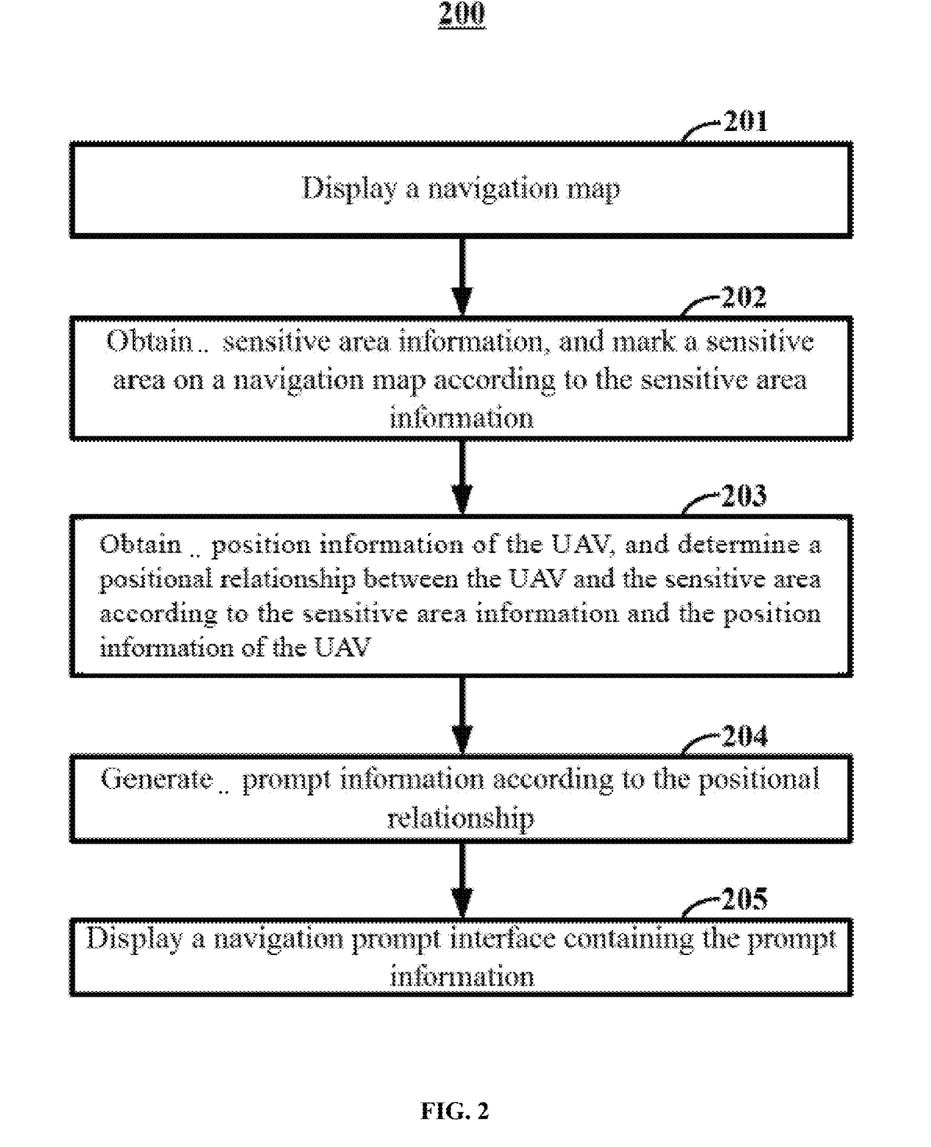
FIG. 2 shows a flowchart of a method of providing prompt information for flight of unmanned aerial vehicles (UAVs) in accordance with embodiments of the disclosure.

FIG. 2 shows a flowchart of a method 200 of providing prompt information for a flight of UAV in accordance with embodiments of the disclosure. In some instances, the method can be implemented by a processor. It will be appreciated that, the method of the disclosure is not limited to the steps and sequence shown in the flowchart of FIG. 2. For instance, additional step can be added to the flowchart of FIG. 2. For instances, one or more steps shown in the flowchart of FIG. 2 can be cancelled. For instance, a sequence of performing the steps shown in the flowchart of FIG. 2 can be altered. In some embodiments, a processing of the method of providing prompt information 200 can start from step 201.

In step 201, a navigation map can be displayed.

It will be appreciated that, the navigation map can be a map which is generated from data pre-stored in a map database. In some embodiments, the step of displaying a navigation map can be omitted. For instance, a connection can be established with a map provider platform or a third-party platform, such that a map can be directly displayed by the map provider platform or the third-party platform.

In step 202, sensitive area information can be obtained, and a sensitive area can be marked on the navigation map according to the sensitive area information. The sensitive area can be provided to affect a flight of the UAV.

In some embodiments, the obtained sensitive area information can comprise at least one of pre-stored sensitive area information or sensitive area information received in real time. The sensitive area information received in real time can be information pushed from a supervisory platform. In some instances, the sensitive area information received in real time can comprise a static data and a dynamic data. The static data can comprise a sensitive area parameter which is initially provided, and the dynamic data can comprise a sensitive area parameter which is updated in real time.

In some embodiments, the sensitive area information can comprise a type of sensitive area, also referred to as a "sensitive area type." The method of providing prompt information 200 in accordance with the embodiment can further comprise setting a correspondence between a type of sensitive area and a level of sensitivity, and setting a correspondence between a level of sensitivity and a pattern of marking, also referred to as a "marking pattern."

In some embodiments, the type of sensitive area can be one of at least a warning zone type (or simply a "warning zone"), a releasable flight-restricted zone type (or simply a :releasable flight-restricted zone"), and a non-releasable no-fly zone type (or simply a "non-releasable no-fly zone"). The level of sensitivity can be one of at least level one, level two and level three.

In some embodiments, setting a correspondence between a type of sensitive area and a level of sensitivity can comprise: associate the warning zone with the level one, a sensitive area of level one being configured to provide a warning prompt to a flight of the UAV; associate the flight-restricted zone with the level two, a sensitive area of level two being configured to provide a restriction prompt to a flight of the UAV; and associate the no-fly zone with the level three, a sensitive area of level three being configured to provide a prohibition prompt to a flight of the UAV.

In some embodiments, the sensitive area information can comprise position information of the sensitive area. The process of marking a sensitive area on a navigation map according to the sensitive area information can comprise: determining a position of the sensitive area on the navigation map according to position information of the sensitive area; determining a level of sensitivity of the sensitive area according to the type of sensitive area; and marking the sensitive area using a pattern of marking corresponding to the determined level of sensitivity.

Optionally, the method of providing prompt information 200 in accordance with the embodiment can further comprise marking the level of sensitivity of the sensitive area on the navigation map.

In some embodiments, the pattern of marking can comprise at least one of a color block or an icon.

In some instances, a shape of the color block can comprise at least one of a regular contour or an actual contour of the sensitive area. The regular contour can comprise at least one of a circular contour, a square contour or an equilateral polygonal contour.

In the method of providing prompt information 200 according to embodiments of the disclosure, a color block having a regular contour can be used to mark the sensitive area, where the color block having a regular contour can completely cover an actual contour of the sensitive area.

It will be appreciated that, the actual contour of the sensitive area can comprise various irregular contours. Therefore, a non-sensitive area can be covered by the color block having a regular contour if a color block having a regular contour is used to mark the sensitive area.

In some instances, an actual contour of the sensitive area can be an irregular shape or a shape having a large number of feature points. An intensive computation can be performed by the UAV to determine a positional relationship between the UAV and the sensitive area once the UAV receives a parameter of the actual contour of the sensitive area. A regular shape or a shape having less feature points can be used to cover the actual contour of the sensitive area, such that a computational burden on a flight controller of the UAV can be reduced, and thus a requirement on a configuration of the UAV can be lowered to reduce a cost. For instance, a circle or a rectangle covering the actual contour can be displayed if an actual contour of the sensitive area is a polygon or an irregular shape.

In some instances, the method of providing prompt information 200 in accordance with the embodiment can further comprise marking the actual contour of the sensitive using a dashed line. The operator can clearly learn a position and a range of the actual sensitive area by displaying the actual contour of the sensitive area in a regular contour. It will be appreciated that, a solid line or a different color can optionally be used to mark the actual contour of the sensitive area.

In some embodiments, a color of the color block can at least comprise a green color, a yellow color and a red color. The process of setting a correspondence between a level of sensitivity and a pattern of marking can comprise: associating the level one with a green color block; associating the level two with a yellow color block; and associating the level three with a red color block.

In some instances, the icon can at least comprise an icon of a representative object in the sensitive area. For example, an airplane icon can be used to mark an airport, a certain animal icon can be used to mark a zoo, and a doctor avatar icon can be used to mark a hospital.

It will be appreciated that, in the method of providing prompt information 200, a color block or an icon can be solely used to mark the sensitive area. In some instances, however, in case a density of the sensitive areas is high or a size of sensitive areas is small, some sensitive areas may not be clearly displayed on the navigation map having a limited size if the sensitive areas are solely marked with color blocks. Therefore, in the method of providing prompt information 200, both a color block and an icon can be used to mark the sensitive areas. For instance, a color block can be used to mark some of the sensitive areas, and an icon can be used to mark the others.

In step 203, position information of the UAV can be obtained, and a positional relationship between the UAV and the sensitive area can be determined according to the sensitive area information and position information of the UAV.

In some embodiments, the step 203 can comprise determining a positional relationship between the UAV and the marked sensitive area according to the sensitive area information marked on the navigation map and the position information of the UAV.

Alternatively, the step 203 can comprise determining a positional relationship between the UAV and the sensitive area according to the position information of a sensitive area included in the sensitive area information and the position information of the UAV.

It will be appreciated that, the flight controller of the UAV can be configured to obtain the sensitive area information and determine a positional relationship between the UAV and the sensitive area according to the sensitive area information and the position information of the UAV. Therefore, in alternative embodiments, in the step 203, the positional relationship between the UAV and the sensitive area can be determined by the flight controller of the UAV.

Optionally, the method of providing prompt information 200 can further comprise marking the flight position of the UAV on the navigation map according to the position information of the UAV, such that the UAV operator can intuitively observe the positional relationship between the UAV and the sensitive area.

In step 204, prompt information can be generated according to the positional relationship.

In step 205, a navigation prompt interface containing the prompt information can be displayed.

In some embodiments, the method of providing prompt information 200 can further comprise providing the prompt information by an audio signal.

In some embodiments, the prompt information can be generated when the positional relationship shows that a horizontal distance between the UAV and the sensitive area is less than a predefined distance. The prompt information can comprise at least one of a type of the sensitive area, a level of sensitivity of the sensitive area or a distance between the UAV and the sensitive area.

In some embodiments, in the method of providing prompt information 200, a color block having a circular contour can be used to mark the sensitive area, such that a distance between the UAV and a surrounding sensitive area can be calculated.

In some embodiments, the prompt information can be generated when the positional relationship shows that a position of the UAV is within the marked sensitive area. The prompt information can comprise at least one of a type of the sensitive area or a level of sensitivity of the sensitive area.

In some instances, when the positional relationship shows that a position of the UAV is within the marked warning zone (e.g., the UAV flies within the warning zone), the prompt information can comprise prompt information alerting the UAV, and the navigation prompt interface can at least comprise a prompt option as to whether to remove a marking of the warning zone.

In some embodiments, the method of providing prompt information 200 can further comprise receiving operation information with respect to the prompt option, and if the operation information indicates a removal of a marking of the warning zone, removing the marking of the warning zone.

In some embodiments, the method of providing prompt information 200 can further comprise receiving a setting operation information with respect to adding or removing a marking of the warning zone, and adding or removing the marking of the warning zone according to the received setting operation information.

It will be appreciated that, when the UAV flies in the warning zone, the prompt information can be configured to alert a flight of the UAV without imposing a restriction on a flight of the UAV. For example, a flight of the UAV in the warning zone may not be restricted, and the UAV operator can decide to turn on or turn off the marking of the warning zone in light of actual situations.

In some embodiments, when the positional relationship shows that a position of the UAV is within the marked flight-restricted zone (e.g., when the UAV flies in the flight-restricted zone), the prompt information can comprise prompt information restricting a flight of the UAV, and the navigation prompt interface can at least comprise a prompt option as to whether to release the flight-restricted zone.

The method of providing prompt information 200 can further comprise: receiving operation information with respect to the prompt option; if the operation information indicates a release of the flight-restricted zone, obtaining a valid identity information, and sending the operation information and the valid identity information to a supervisory platform; and removing a marking of the flight-restricted zone (e.g., releasing the flight-restricted zone) if a releasing instruction is received from the supervisory platform.

In some embodiments, the valid identity information can comprise at least one of an identity information of the UAV operator or an authentication certificate. The authentication certificate can at least comprise an authenticated identity information of the UAV operator. The operation information and the valid identity information can be submitted to the supervisory platform via an online verification platform.

In some embodiments, the method of providing prompt information 200 can further comprise removing a navigation prompt interface corresponding to a sensitive area if a marking of the sensitive area is removed.

In some embodiments, the method of providing prompt information 200 can further comprise, if a plurality of sensitive areas having different levels of sensitivity overlap and a marking of a sensitive area having a lower level of sensitivity is removed, maintaining a marking of a sensitive area having a higher level of sensitivity in the overlapped area.

For instance, when a yellow color block marking a flight-restricted zone overlaps with a red color block marking a no-fly zone, or when a red color block is completely covered by a yellow color block, or when a yellow color block is completely covered by a red color block, the red color block can be maintained in the overlapped area even if the flight-restricted zone is released (e.g., the yellow color block is removed) as the no-fly zone is not released.

In some embodiments, the prompt information can comprise prompt information prohibiting a flight of the UAV if the positional relationship shows that a position of the UAV is within the marked no-fly zone (e.g., the UAV flies in the no-fly zone). The navigation prompt interface can comprise at least one of a plurality of confirmation options, the confirmation options including confirming a permission of entering the no-fly zone, confirming a liability of flying in the no-fly one and confirming continuing a flight in the no-fly zone.

In some embodiments, the method of providing prompt information 200 can further comprise receiving operation information with respect to the confirmation option and sending the operation information to the supervisory platform, such that the supervisory platform can monitor a flight of the UAV and pursue legal action against the UAV operator if the UAV flies in a sensitive area in breach of security regulations.

In some instances, if the sensitive area information is initially not available to the UAV or the sensitive area information is updated during a flight of the UAV, the UAV can already be positioned in a sensitive area once the sensitive area information is obtained or updated. In this case, prompt information can be generated according to position information of the UAV and the sensitive area. In some embodiments, the prompt information can comprise prompt information instructing the UAV to land or leave the sensitive area. In some instances, operation information can be received and a control instruction can be generated during a landing of the UAV, such that the flight controller of the UAV can direct to change a flight path of the UAV according to the control instruction. In some instances, the process of providing prompt information instructing the UAV to leave the sensitive area can comprise receiving operation information and generating a control instruction, such that the UAV can be directed to leave the sensitive area according to the control instruction. In some instances, the process of providing prompt information instructing the UAV to leave the sensitive area can comprise calculating a shortest flight path and directing the UAV to leave the sensitive area along the shortest path. It will be appreciated that, the shortest path can be calculated by the flight controller of the UAV.

With the method of providing prompt information for UAV in accordance with embodiments of the disclosure, a sensitive area can be intuitively marked on a navigation map and prompt information can be generated according to a positional relationship between the UAV and the sensitive area, such that a UAV operator can make a correct flight decision and avoid a flight of the UAV in the sensitive area.

Figure 3:
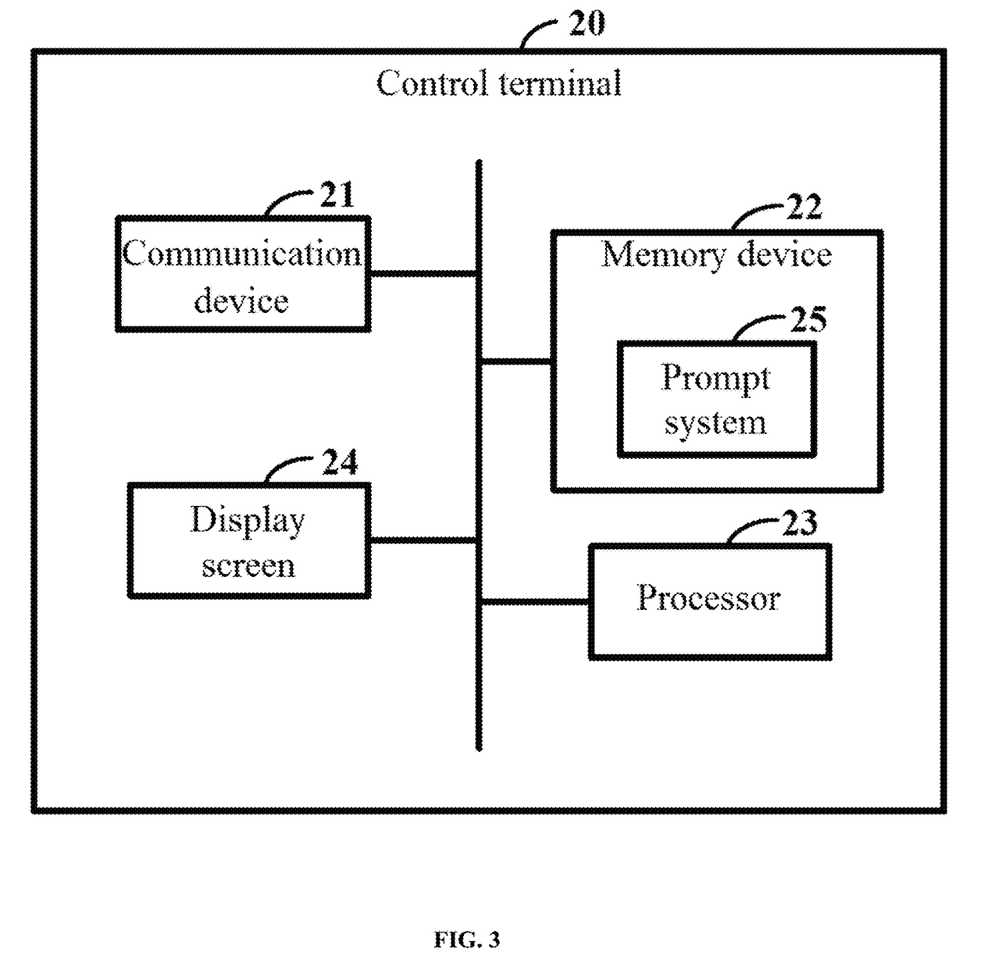
FIG. 3 shows a configuration of a control terminal in accordance with embodiments of the disclosure, the control terminal comprising a prompt system.

FIG. 3 shows a configuration of a control terminal 20 in accordance with embodiments of the disclosure. The control terminal can be configured to control a flight of a UAV. In some embodiments, the control terminal 20 can include, but not limited to, a communication device 21, a memory device 22, a processor and a display screen 24. The memory device 22 can be configured to store various data of the control terminal 20, including an identity information of the UAV operator, an identity information of the UAV and/or sensitive area information. In some instances, the memory device 22 can be an internal memory of the control terminal 20. Optionally, the memory device 22 can be a removable storage device, such as a removable media card, an external flash disk, or other type of flash memory or memory. The processor 23 can be configured to control an operation of the control terminal 20. The processor 23 can be a central processing unit (CPU), a microprocessor, a digital signal processor or other type of data processing chip.

The communication device 21 can be configured to communicate with a UAV. For instance, the communication device 21 can receive a UAV position information from the UAV. The display screen 24 can be configured to display data and an interface with which the control terminal 20 can interact with a user.

In some embodiments, the control terminal 20 can further comprise a prompt system 25. The prompt system 25 can be provided in the memory device 22 as a software program or instructions and executed by the processor 23. In some embodiments, the prompt system 25 can be divided into one or more modules, the one or more modules being stored in the memory device 22 and executed by one or more processors 23 (e.g., one processor 23 in some embodiments). With the prompt system 25, the control terminal 20 can be configured to intuitively mark a sensitive area on a navigation map and generate a corresponding prompt information according to a positional relationship between the UAV and the sensitive area, such that a UAV operator can make a correct flight decision.

Figure 4:
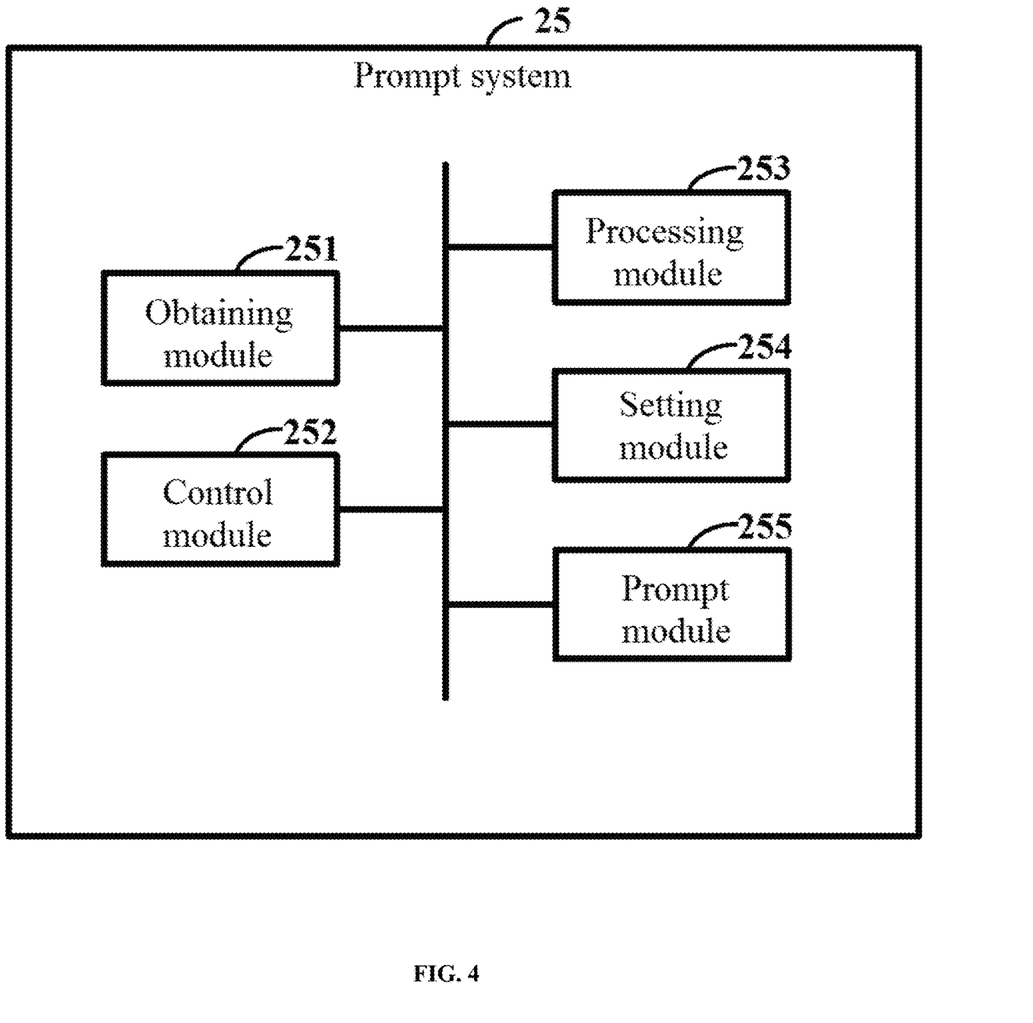
FIG. 4 shows functional modules of the prompt system of FIG. 3.

FIG. 4 shows functional modules of the prompt system 25 in the control terminal 20 in accordance with embodiments of the disclosure. In some embodiments, the prompt system 25 can include, but not limited to, an obtaining module 251, a control module 252 and a processing module 253. In some instances, various functional modules can be implemented as program instructions capable of effecting specific functions. In the disclosure, a software program can be described as a module as it is easier to describe an execution of the functional modules in a computer (e.g., in the processor 23 of the control terminal 20). It will be appreciated that, a functional module can be implemented as a hardware or a firmware.

The control module 252 can be configured to direct the display screen 24 to display a navigation map. It will be appreciated that, the navigation map can be a map which is generated from data pre-stored in a map database. Alternatively, the control module 252 can be configured to direct the communication device 21 of the control terminal 20 to establish a connection with a map provider platform or a third-party platform, such that a map can be directly displayed by the map provider platform or the third-party platform.

The obtaining module 251 can be configured to obtain sensitive area information. In some embodiments, the obtained sensitive area information can comprise at least one of pre-stored sensitive area information or sensitive area information received in real time. The sensitive area information received in real time can be information pushed from a supervisory platform, and can comprise a static data and a dynamic data. The static data can comprise a sensitive area parameter which is initially provided, and the dynamic data can comprise a sensitive area parameter which is updated in real time.

In some embodiments, the control terminal 252 can be configured to mark a sensitive area on a navigation map according to the sensitive area information. The sensitive area can be configured to affect a flight of the UAV.

In some embodiments, the sensitive area information can comprise a type of sensitive area.

In some embodiments, the prompt system 25 can further comprise a setting module 254 which is configured to set a correspondence between a type of sensitive area and a level of sensitivity and set a correspondence between a level of sensitivity and a pattern of marking.

In some embodiments, the type of sensitive area can at least comprise a warning zone, a releasable flight-restricted zone and a non-releasable no-fly zone. The level of sensitivity can at least comprise level one, level two and level three.

In setting a correspondence between a type of sensitive area and a level of sensitivity, the setting module 254 can be configured to associating the warning zone with the level one, a sensitive area of level one being configured to provide a warning prompt to a flight of the UAV; associating the flight-restricted zone with the level two, a sensitive area of level two being configured to provide a restriction prompt to a flight of the UAV; and associating the no-fly zone with the level three, a sensitive area of level three being configured to provide a prohibition prompt to a flight of the UAV.

In some embodiments, the sensitive area information can comprise position information of the sensitive area. In marking a sensitive area on a navigation map according to the sensitive area information, the control terminal 252 can be configured to determine a position of the sensitive area on the navigation map according to position information of the sensitive area; determine a level of sensitivity of the sensitive area according to the type of the sensitive area; and mark the sensitive area using a pattern of marking corresponding to the determined level of sensitivity.

In some embodiments, the control module 252 can further be configured to mark the level of sensitivity of the sensitive area on the navigation map.

In some embodiments, the pattern of marking can comprise at least one of a color block or an icon.

In some instances, a shape of the color block can comprise at least one of a regular contour or an actual contour of the sensitive area. The regular contour can comprise at least one of a circular contour, a square contour or an equilateral polygonal contour.

In some embodiments, the control module 252 can be configured to mark the sensitive area using a color block having a regular contour, where the color block having a regular contour can completely cover an actual contour of the sensitive area.

It will be appreciated that, the actual contour of the sensitive area can comprise various irregular contours. Therefore, a non-sensitive area can be covered by the color block having a regular contour if a color block having a regular contour is used to mark the sensitive area.

In some instances, an actual contour of the sensitive area can be an irregular shape or a shape having a large number of feature points. An intensive computation can be performed by the UAV to determine a positional relationship between the UAV and the sensitive area once the UAV receives a parameter of the actual contour of the sensitive area. A regular shape or a shape having less feature points can be used to cover the actual contour of the sensitive area, such that a computational burden on a flight controller of the UAV can be reduced, and thus a requirement on a configuration of the UAV can be lowered to reduce a cost. For instance, a circle or a rectangle covering the actual contour can be displayed if an actual contour of the sensitive area is a polygon or an irregular shape.

In some instances, the control module 252 can be further configured to mark the actual contour of the sensitive using a dashed line. The operator can clearly learn a position and a range of the actual sensitive area by displaying the actual contour of the sensitive area in a regular contour. It will be appreciated that, a solid line or a different color can optionally be used to mark the actual contour of the sensitive area.

In some embodiments, a color of the color block can at least comprise a green color, a yellow color and a red color. In setting a correspondence between a level of sensitivity and a pattern of marking, the setting module 254 can be configured to associate the level one with a green color block; associate the level two with a yellow color block; and associate the level three with a red color block.

In some instances, the icon can at least comprise an icon of a representative object in the sensitive area. For example, an airplane icon can be used to mark an airport, a certain animal icon can be used to mark a zoo, and a doctor avatar icon can be used to mark a hospital.

It will be appreciated that, the control terminal 252 can be configured to mark the sensitive area solely with a color block or an icon. In some instances, however, in case a density of the sensitive areas is high or a size of sensitive areas is small, some sensitive areas may not be clearly displayed on the navigation map having a limited size if the sensitive areas are solely marked with color blocks. Therefore, the control terminal 252 can be optionally configured to mark the sensitive areas using both a color block and an icon. For instance, a color block can be used to mark some of the sensitive areas, and an icon can be used to mark the others.

The obtaining module 251 can be further configured to obtain position information of the UAV. The processing module 253 can be configured to determine a positional relationship between the UAV and the sensitive area according to the sensitive area information and position information of the UAV.

In some embodiments, the processing module 253 can be configured to determine a positional relationship between the UAV and the marked sensitive area according to the sensitive area information marked on the navigation map and the position information of the UAV.

Alternatively, the processing module 253 can be configured to determine a positional relationship between the UAV and the sensitive area according to the position information of a sensitive area included in the sensitive area information and the position information of the UAV.

It will be appreciated that, the flight controller of the UAV can be configured to obtain the sensitive area information and determine a positional relationship between the UAV and the sensitive area according to the sensitive area information and the position information of the UAV. Therefore, in alternative embodiments, the positional relationship between the UAV and the sensitive area can be determined by the flight controller of the UAV.

Optionally, the control terminal 252 can further be configured to mark the flight position of the UAV on the navigation map according to the position information of the UAV, such that the UAV operator can intuitively observe the positional relationship between the UAV and the sensitive area.

In some embodiments, the processing module 253 can be further configured to generate prompt information according to the positional relationship.

In some embodiments, the prompt system 25 can further comprise a prompt module 255 configured to control an audio output device (not shown) of the control terminal 20 (e.g., a loudspeaker) to provide the prompt information by an audio signal. Additionally or alternatively, the prompt module 255 can be configured to control a display screen of the control terminal 20 to display a navigation prompt interface containing the prompt information.

In some embodiments, the processing module 253 can further be configured to generate the prompt information when the positional relationship shows that a horizontal distance between the UAV and the sensitive area is less than a predefined distance. The prompt information can comprise at least one of a type of the sensitive area, a level of sensitivity of the sensitive area or a distance between the UAV and the sensitive area.

In some embodiments, the control module 252 can be configured to mark the sensitive area using a color block having a circular contour, such that a distance between the UAV and a surrounding sensitive area can be calculated.

In some embodiments, the processing module 253 can further be configured to generate the prompt information when the positional relationship shows that a position of the UAV is within the marked sensitive area. The prompt information can comprise at least one of a type of the sensitive area or a level of sensitivity of the sensitive area.

In some instances, when the positional relationship shows that a position of the UAV is within the marked warning zone (e.g., the UAV flies within the warning zone), the prompt information can comprise prompt information alerting the UAV, and the navigation prompt interface can at least comprise a prompt option as to whether to remove a marking of the warning zone.

In some embodiments, the processing module 253 can further be configured to receive operation information with respect to the prompt option, and if the operation information indicates a removal of a marking of the warning zone, remove the marking of the warning zone.

In some embodiments, the processing module 253 can further be configured to receive a setting operation information with respect to adding or removing a marking of the warning zone, and add or remove the marking of the warning zone according to the received setting operation information.

It will be appreciated that, when the UAV flies in the warning zone, the prompt information can be configured to alert a flight of the UAV without imposing a restriction on a flight of the UAV. For example, a flight of the UAV in the warning zone may not be restricted, and the UAV operator can decide to turn on or turn off the marking of the warning zone in light of actual situations.

In some embodiments, when the positional relationship shows that a position of the UAV is within the marked flight-restricted zone (e.g., when the UAV flies in the flight-restricted zone), the prompt information can comprise prompt information restricting a flight of the UAV, and the navigation prompt interface can at least comprise a prompt option as to whether to release the flight-restricted zone.

The processing module 253 can further be configured to receive operation information with respect to the prompt option; if the operation information indicates a release of the flight-restricted zone, obtain a valid identity information, and send the operation information and the valid identity information to a supervisory platform; and remove a marking of the flight-restricted zone (e.g., releasing the flight-restricted zone) if a releasing instruction is received from the supervisory platform.

In some embodiments, the valid identity information can comprise at least one of an identity information of the UAV operator or an authentication certificate. The authentication certificate can at least comprise an authenticated identity information of the UAV operator. The operation information and the valid identity information can be submitted to the supervisory platform via an online verification platform.

In some embodiments, the processing module 253 can further be configured to remove a navigation prompt interface corresponding to a sensitive area if a marking of the sensitive area is removed.

In some embodiments, the processing module 253 can further be configured to, if a plurality of sensitive areas having different levels of sensitivity overlap and a marking of a sensitive area having a lower level of sensitivity is removed, maintain a marking of a sensitive area having a higher level of sensitivity in the overlapped area.

For instance, when a yellow color block marking a flight-restricted zone overlaps with a red color block marking a no-fly zone, or when a red color block is completely covered by a yellow color block, or when a yellow color block is completely covered by a red color block, the red color block can be maintained in the overlapped area even if the flight-restricted zone is released (e.g., the yellow color block is removed) as the no-fly zone is not released.

In some embodiments, when the positional relationship shows that a position of the UAV is within the marked no-fly zone (e.g., the UAV flies in the no-fly zone), the prompt information can comprise prompt information prohibiting a flight of the UAV. The navigation prompt interface can comprise at least one of a plurality of confirmation options, the confirmation options including confirming a permission of entering the no-fly zone, confirming a liability of flying in the no-fly one and confirming a flight in the no-fly zone.

In some embodiments, the processing module 253 can further be configured to receive operation information with respect to the confirmation option and send the operation information to the supervisory platform, such that the supervisory platform can monitor a flight of the UAV and pursue legal action against the UAV operator if the UAV flies in a sensitive area in breach of security regulations.

In some instances, if the sensitive area information is initially not available to the obtaining module 251 or the flight controller of the UAV or the sensitive area information is updated during a flight of the UAV, the UAV can already be positioned in a sensitive area once the sensitive area information is obtained or updated. In this case, prompt information can be generated by the processing module 253 according to position information of the UAV and the sensitive area. In some embodiments, the prompt information can comprise prompt information instructing the UAV to land or leave the sensitive area. In some instances, operation information can be received and a control instruction can be generated by the processing module 253 during a landing of the UAV, such that the flight controller of the UAV can direct to change a flight path of the UAV according to the control instruction. In some instances, operation information can be received and a control instruction can be generated by the processing module 253 during UAV leaving the sensitive area, such that the UAV can be directed to leave the sensitive area according to the control instruction. In some instances, a shortest flight path can be calculated by the processing module 253 to direct the UAV to leave the sensitive area along the shortest path. It will be appreciated that, the shortest path can be calculated by the flight controller of the UAV.

With the prompt system 25 for a flight of UAV in accordance with embodiments of the disclosure, a sensitive area can be intuitively marked on a navigation map and prompt information can be generated according to a positional relationship between the UAV and the sensitive area, such that a UAV operator can make a correct flight decision and avoid a flight of the UAV in the sensitive area.

It will be appreciated that, various functional modules of the prompt system 25 can be implemented corresponding to relevant steps described with reference to FIG. 2.

It will be appreciated that, the device and method disclosed in embodiments of the disclosure can be implemented in various other manners. For instance, the described device embodiments are merely illustrative. For instance, a division of modules or units is merely a division based upon a logical function. Various divisions can be possible in actual implementation. For instance, multiple units or components can be combined or integrated on another system. For instance, some features can be ignored or not be performed. For instance, a mutual coupling, a direct coupling or a communication connection as shown or discussed can be an indirect coupling or a communication connection via an interface, a means or a unit. The coupling can be an electrical coupling or a mechanical coupling.

The units illustrated as separate parts may or may not be physically separated. The parts shown as units may or may not be physical units. For instance, the parts can be provided at the same location or distributed over a plurality of network units. All or part of the units can be selected to implement the embodiments of the disclosure according to actual requirements.

Various functional units in the embodiments of the disclosure may be integrated in one processing unit. The functional units can be separate and physical units. Two or more units may be integrated in one unit. The integrated units may be implemented as hardware or software functional units.

The integrated units, if implemented as software functional units and sold or used as independent products, may be stored in a computer-readable storage medium. With such an understanding, essentially the technical solution of the disclosure, or a part making contribution over the prior art, or all or part of the technical solution may be embodied as a software product. The computer software product is stored in a storage medium and includes several instructions for causing a computer processor to execute all or part of steps of the method according to the various embodiments of the present disclosure. The above mentioned storage medium includes: various media capable of storing program code, such as a U disk, a removable hard disk, ROM (read-only memory), RAM (random access memory), a diskette, an optical disk, etc.

The embodiments as described hereinabove are intended to merely illustrate rather than limit the disclosure. While some embodiments of the disclosure are shown and described herein, numerous variations and substitutions will occur to those skilled in the art without departing from the scope of the disclosure.

What is claimed is:

1. A method of providing prompt information comprising:
obtaining sensitive area information and marking a sensitive area on a navigation map according to the sensitive area information, the sensitive area affecting a flight of an unmanned aerial vehicle (UAV), the sensitive area information includes a sensitive area type, the sensitive area type being selected from a warning zone type, a flight-restricted zone type, and a non-releasable no-fly zone type;
obtaining position information of the UAV and determining a positional relationship between the UAV and the sensitive area according to the sensitive area information and the position information of the UAV;
generating the prompt information according to the positional relationship and the sensitive area information, including:
in response to the sensitive area type being the warning zone type, generating a warning prompt including a warning message;
in response to the sensitive area type being the flight-restricted zone type, generating a restriction prompt including a flight restriction message; and
in response to the sensitive area type being the no-fly zone type, generating a prohibition prompt including a flight prohibition message;
in response to the positional relationship showing that the UAV is within the sensitive area and the sensitive area type being the flight-restricted zone type, performing:
displaying a prompt option as to whether to release the flight-restricted zone;
in response to receiving a request to release the flight-restriction zone, obtaining identity information, and sending the identity information to a supervisory platform to verify the identity information; and
in response to receiving a release command from the supervisory platform, removing an indication of flight restriction from the sensitive area;
setting a correspondence between the sensitive area type and a level of sensitivity, the level of sensitivity including at least one of level one, level two, or level three, and setting the correspondence between the sensitive area type and the level of sensitivity including:
associating the warning zone type with the level one;
associating the flight-restricted zone type with the level two; or
associating the no-fly zone type with the level three; and
setting a correspondence between the level of sensitivity and a marking pattern;
removing a navigation prompt interface corresponding to the sensitive area when the marking of the sensitive area is removed; and
when a plurality of sensitive areas having different levels of sensitivity overlap and the marking of one of the plurality of sensitive areas having a lower level of sensitivity is removed, maintaining the marking of another one of the plurality of sensitive areas having a higher level of sensitivity in the overlapped area.

2. The method of claim 1,
wherein the sensitive area information further includes position information of the sensitive area;

the method further comprising:
  marking the sensitive area on the navigation map according to the sensitive area information by:
    determining a position of the sensitive area on the navigation map according to the position information of the sensitive area;
    determining the level of sensitivity of the sensitive area according to the sensitive area type; and
    marking the sensitive area using the marking pattern corresponding to the level of sensitivity.

3. The method of claim 2, wherein:
the marking pattern includes at least one of a color block or an icon;
a color of the color block includes at least one of green, yellow, or red;
a shape of the color block includes at least one of a regular contour or an actual contour of the sensitive area; and
the icon includes at least an icon of a representative object in the sensitive area.

4. The method of claim 2, wherein marking the sensitive area includes marking the sensitive area using a color block having a regular contour completely covering an actual contour of the sensitive area.

5. The method of claim 2, wherein determining the positional relationship between the UAV and the sensitive area according to the sensitive area information and the position information of the UAV includes:
  determining the positional relationship between the UAV and the marked sensitive area according to the sensitive area information marked on the navigation map and the position information of the UAV.

6. The method of claim 5, wherein:
the prompt information is generated in response to the positional relationship showing that a horizontal distance between the UAV and the sensitive area is less than a predefined distance; and
the prompt information includes at least one of the sensitive area type, the level of sensitivity of the sensitive area, or a distance between the UAV and the sensitive area.

7. The method of claim 5, further comprising:
displaying a navigation prompt interface containing the prompt information.

8. The method of claim 7, wherein:
in response to the positional relationship showing that the position of the UAV is within the warning zone, the prompt information further includes prompt information alerting the flight of the UAV and the navigation prompt interface further includes at least a prompt option as to whether to remove the marking of the warning zone; or
in response to the positional relationship showing that the position of the UAV is within a no-fly zone, the prompt information further includes prompt information prohibiting the flight of the UAV and the navigation prompt interface further includes at least one of a plurality of confirmation options including confirming a permission of entering the no-fly zone, confirming a liability of flying in the no-fly zone, and confirming continuing to fly in the no-fly zone.

9. The method of claim 1, wherein generating the prompt information according to the positional relationship includes generating prompt information instructing the UAV to land or leave the sensitive area in response to the UAV being in the sensitive area.

10. The method of claim 9, wherein generating the prompt information instructing the UAV to leave the sensitive area includes:
receiving operation information and generating a control instruction, the control instruction directing the UAV to leave the sensitive area; or
calculating a shortest flight path and directing the UAV to leave the sensitive area along the shortest path.

11. A control terminal comprising:
a communication device configured to communicate with an unmanned aerial vehicle (UAV) and receive position information of the UAV; and
a processor configured to:
  obtain sensitive area information and mark a sensitive area on a navigation map according to the sensitive area information, the sensitive area affecting a flight of the UAV, the sensitive area information includes a sensitive area type, the sensitive area type being selected from a warning zone type, a flight-restricted zone type, and a non-releasable no-fly zone type;
  obtain position information of the UAV and determine a positional relationship between the UAV and the sensitive area according to the sensitive area information and position information of the UAV;
  generate prompt information according to the positional relationship and the sensitive area information, including:
    in response to the sensitive area type being the warning zone type, generating a warning prompt including a warning message;
    in response to the sensitive area type being the flight-restricted zone type, generating a restriction prompt including a flight restriction message; and
    in response to the sensitive area type being the no-fly zone type, generating a prohibition prompt including a flight prohibition message;
  in response to the positional relationship showing that the UAV is within the sensitive area and the sensitive area type being the flight-restricted zone type, perform:
    displaying a prompt option as to whether to release the flight-restricted zone,
    in response to receiving a request to release the flight-restriction zone, obtaining identity information, and sending the identity information to a supervisory platform to verify the identity information; and
    in response to receiving a release command from the supervisory platform, removing an indication of flight restriction from the sensitive area;
  set a correspondence between the sensitive area type and a level of sensitivity, the level of sensitivity including at least one of level one, level two, or level three, and setting the correspondence between the sensitive area type and the level of sensitivity including:
    associating the warning zone type with the level one;
    associating the flight-restricted zone type with the level two; or
    associating the no-fly zone type with the level three; and
    setting a correspondence between the level of sensitivity and a marking pattern;
  remove a navigation prompt interface corresponding to the sensitive area when the marking of the sensitive area is removed; and when a plurality of sensitive areas having different levels of sensitivity overlap and the marking of one of the plurality of sensitive areas having a lower level of sensitivity is removed, maintain the marking of another one of the plurality of sensitive areas having a higher level of sensitivity in the overlapped area.

12. The control terminal of claim 11, wherein:
the sensitive area information further includes position information of the sensitive area; and
the processor is further configured to:
   determine a position of the sensitive area on the navigation map according to the position information of the sensitive area;
   determine a level of sensitivity of the sensitive area according to the sensitive area type; and
   mark the sensitive area using a marking pattern corresponding to the level of sensitivity.

13. The control terminal of claim 12, wherein the processor is further configured to:
   mark the sensitive area using a color block having a regular contour completely covering an actual contour of the sensitive area; or
   determine the positional relationship between the UAV and the sensitive area according to the sensitive area information marked on the navigation map and the position information of the UAV.

14. The control terminal of claim 11, wherein the processor is further configured to mark a flight position of the UAV on the navigation map according to the position information of the UAV.

15. A processor used in a control terminal of an unmanned aerial vehicle (UAV), wherein the processor is configured to:
   obtain sensitive area information and mark a sensitive area on a navigation map according to the sensitive area information, the sensitive area affecting a flight of the UAV, the sensitive area information includes a sensitive area type, the sensitive area type being selected from a warning zone type, a flight-restricted zone type, and a non-releasable no-fly zone type;
   obtain position information of the UAV and determine a positional relationship between the UAV and the sensitive area according to the sensitive area information and position information of the UAV;
   generate prompt information according to the positional relationship and the sensitive area information, including:
      in response to the sensitive area type being the warning zone type, generating a warning prompt including a warning message;
      in response to the sensitive area type being the flight-restricted zone type, generating a restriction prompt including a flight restriction message; and
      in response to the sensitive area type being the no-fly zone type, generating a prohibition prompt including a flight prohibition message;
   in response to the positional relationship showing that the UAV is within the sensitive area and the sensitive area type being the flight-restricted zone type, perform:
      displaying a prompt option as to whether to release the flight-restricted zone,
      in response to receiving a request to release the flight-restriction zone, obtaining identity information, and sending the identity information to a supervisory platform to verify the identity information; and
      in response to receiving a release command from the supervisory platform, removing an indication of flight restriction from the sensitive area;
   set a correspondence between the sensitive area type and a level of sensitivity, the level of sensitivity including at least one of level one, level two, or level three, and setting the correspondence between the sensitive area type and the level of sensitivity including:
      associating the warning zone type with the level one;
      associating the flight-restricted zone type with the level two; or
      associating the no-fly zone type with the level three; and
      setting a correspondence between the level of sensitivity and a marking pattern;
   remove a navigation prompt interface corresponding to the sensitive area when the marking of the sensitive area is removed; and
   when a plurality of sensitive areas having different levels of sensitivity overlap and the marking of one of the plurality of sensitive areas having a lower level of sensitivity is removed, maintain the marking of another one of the plurality of sensitive areas having a higher level of sensitivity in the overlapped area.

16. The method of claim 1, further comprising marking the sensitive area using a color block, wherein:
   the sensitive area is of an irregular shape;
   the color block has a rectangular shape or a circular shape, and completely covers the sensitive area; and
   the method further comprising marking an actual contour of the sensitive area using a dashed line.

17. The method of claim 1, wherein:
   the sensitive area is one or a plurality of sensitive areas; and
   the method further includes marking one of the plurality of sensitive areas with color blocks covering the sensitive areas and marking another one of the plurality of sensitive areas with an icon of representative objects of the sensitive areas.

* * * * *